United States Patent
Takabatake

(10) Patent No.: US 7,219,947 B2
(45) Date of Patent: May 22, 2007

(54) SUN VISOR FOR VEHICLE

(75) Inventor: Yoshihiro Takabatake, Toyota (JP)

(73) Assignees: Kyowa Sangyo Co, Ltd, Toyota-shi, Aichi-ken (JP); Shinwa Seiko Co, Ltd, Toyota-shi, Aichi-ken (JP)

( * ) Notice: Subject to any disclaimer, the term of this patent is extended or adjusted under 35 U.S.C. 154(b) by 0 days.

(21) Appl. No.: 10/595,543

(22) PCT Filed: Sep. 29, 2004

(86) PCT No.: PCT/JP2004/014261

§ 371 (c)(1), (2), (4) Date: May 9, 2006

(87) PCT Pub. No.: WO2005/042285

PCT Pub. Date: May 12, 2005

(65) Prior Publication Data

US 2007/0018477 A1    Jan. 25, 2007

(30) Foreign Application Priority Data

Oct. 31, 2003 (JP) ............................. 2003-371964

(51) Int. Cl.
*B60J 3/00* (2006.01)
(52) U.S. Cl. .................. 296/97.8; 296/97.1
(58) Field of Classification Search ............... 296/97.8, 296/97.11, 97.6, 97.1
See application file for complete search history.

(56) References Cited

U.S. PATENT DOCUMENTS

| | | | |
|---|---|---|---|
| 5,042,867 A | * | 8/1991 | Crotty et al. ............... 296/97.8 |
| 5,156,434 A | * | 10/1992 | Vandagriff .................. 296/97.8 |
| 5,365,416 A | * | 11/1994 | Peterson ...................... 362/135 |
| 5,711,570 A | * | 1/1998 | Wu et al. ................... 296/97.8 |
| 6,189,949 B1 | * | 2/2001 | Miller et al. ............... 296/97.8 |
| 6,585,308 B2 | * | 7/2003 | Sturt et al. .................. 296/97.8 |
| 6,604,772 B2 | * | 8/2003 | Sturt ......................... 296/97.8 |

FOREIGN PATENT DOCUMENTS

JP    2002-144866 A    5/2005

OTHER PUBLICATIONS

Japanese Laid-Open Utility Model Publication No. 59-43315.
Japanese Laid-Open Utility Model Publication No.2-115018.

* cited by examiner

*Primary Examiner*—Jason Morrow
(74) *Attorney, Agent, or Firm*—Conley Rose, P.C.

(57) ABSTRACT

A sun visor for a vehicle is provided that can prevent an extendable plate from being removed from the sun visor body. In a sun visor for a vehicle in which an extendable plate (40) is mounted within a sun visor body (20) such that the extendable plate can be drawn out, a removal-preventing member (55) protruding in an inclined configuration is formed on one side surface of the extendable plate. Conversely, a removal preventing recess (52) is formed within the sun visor body (22) for engaging with a tip end portion of the removal-preventing member and for preventing the extendable plate from being removed. A recess wall surface on one side of the removal-preventing recess is formed as an inclined surface (53) for guiding the tip end portion of the removal-preventing member in a wedging direction into the removal-preventing recess.

9 Claims, 3 Drawing Sheets

SUN VISOR FOR VEHICLE

FIELD OF THE INVENTION

This application relates to sun visors having a visor body within which an extendable plate is mounted such that the extendable plate can be drawn out.

BACKGROUND ART

Conventionally, with a vehicle sun visor having a visor body 120 to which an extendable plate 140 is mounted such that the extendable plate can be drawn out, as shown in FIG. 6, it is necessary to prevent the extendable plate 140 from being further drawn out and removed when the extendable plate 140 has been drawn out to a predetermined drawing position with respect to the sun visor body 120. For this reason, a sun visor is known that has a removal-preventing member 155, protruding from a side surface of the extendable plate 140, while a stopper member 151, having a stopper surface perpendicular to a drawing direction and adapted to contact with the tip end portion of the removal-preventing member 155, is disposed to extend within the sun visor body 120 (for example, see Patent Document 1)

Patent Document 1. Japanese Laid-Open Patent Publication No. 2002-178750

DISCLOSURE OF THE INVENTION

Problems to be Solved by the Invention

In some cases, if an external force exceeding a predetermined value is applied to the extendable plate 140 in a condition in which the extendable plate 140 has been drawn out to a predetermined drawing position (i.e., a drawing termination position where the stopper 151 contacts with the tip end portion of the removal-preventing member 155), the removal-preventing member 155 may bypass the stopper member 151, as shown in FIG. 7. For this reason, the engagement between the removal-preventing member 155 and the stopper member 151 may be diminished and the extendable plate 140 may drop off from the engagement For example, in some cases if an impact load, produced when a curtain airbag (a side airbag) is deployed (inflated), is applied to the extendable plate 140 in the condition in which the sun visor body 120 is positioned at a side light-shielding position along a side glass window and the extendable plate 140 has been drawn to a predetermined drawing position, the extendable plate 140 may be dropped off.

In view of the problems of the prior art, it is an object of the present invention to provide a vehicle sun visor that can firmly prevent an extendable plate from being removed from a sun visor body and can prevent the extendable plate from dropping off.

Means for Solving the Problems

In order to achieve the above object a vehicle sun visor, according to first aspect of the present invention, is a vehicle sun visor in which an extendable plate is mounted within a sun visor body such that the extendable plate can be drawn out. The sun visor is characterized in that a removal preventing member, protruding in an inclined configuration, is formed on one side surface of the extendable plate. Correspondingly, a removal-preventing recess is formed within the sun visor body for engaging with a tip end portion of the removal-preventing member and for preventing the extendable plate from being removed. In addition, a recess wall surface on one side of the removal-preventing recess is formed as an inclined surface for guiding the tip end portion of the removal-preventing member in a wedging direction into the removal-preventing recess.

Therefore, when the extendable plate has been drawn out to a predetermined drawing position with respect to the sun visor body, the removal-preventing member may engage with the removal-preventing recess in order to restrain the extendable plate from being further drawn out.

When an external force exceeding a predetermined value has been applied to the extendable plate in the state where the extendable plate has been drawn out to the predetermined drawing position, the tip end of the removal-preventing member may be guided in the wedging direction into the removal-preventing recess This may enhance the engaging force between the removal-preventing member and the removal-preventing recess A vehicle sun visor according to a second aspect is a vehicle sun visor defined in the first aspect and is characterized in that the sun visor body has a first shell and a second shell. A storage space having an inlet/outlet corresponding to the extendable plate is defined between the first and second shells. A stopper member is disposed to protrude from an inner wall surface of the first shell and has an inclined surface forming a removal-preventing recess at a position proximate to the inlet/outlet in cooperation with the inner wall surface, and defining the recess wall surface on one side of the removal-preventing recess.

Therefore, for a sun visor body formed to have a first shell and a second shell, the removal-preventing recess can be easily formed in cooperation with the inner wall surface of the first shell by providing a stopper member that protrudes from an inner wall surface of the first shell and has an inclined surface defining the recess wall surface on one side of the removal-preventing recess.

A vehicle sun visor according to a third aspect is a vehicle sun visor defined in the first or second aspect and is characterized in that the removal-preventing member is formed as an elongated member along a widthwise direction of one side surface of the extendable plate. By forming the removal-preventing member as an elongated member along a widthwise direction of one side surface of the extendable plate, the strength of the removal-preventing member can be improved and it is possible to largely and effectively prevent the extendable plate from being removed.

Advantages of the Invention

According to the present invention, when an external force exceeding a predetermined value has been applied to the extendable plate, the tip end of the removal-preventing member may be guided in the wedging direction into the removal-preventing recess. This may enhance the engaging force between the removal-preventing member and the removal-preventing recess, so that it is possible to prevent the problems of the extendable plate dropping-off from the sun visor body.

Figure 1:
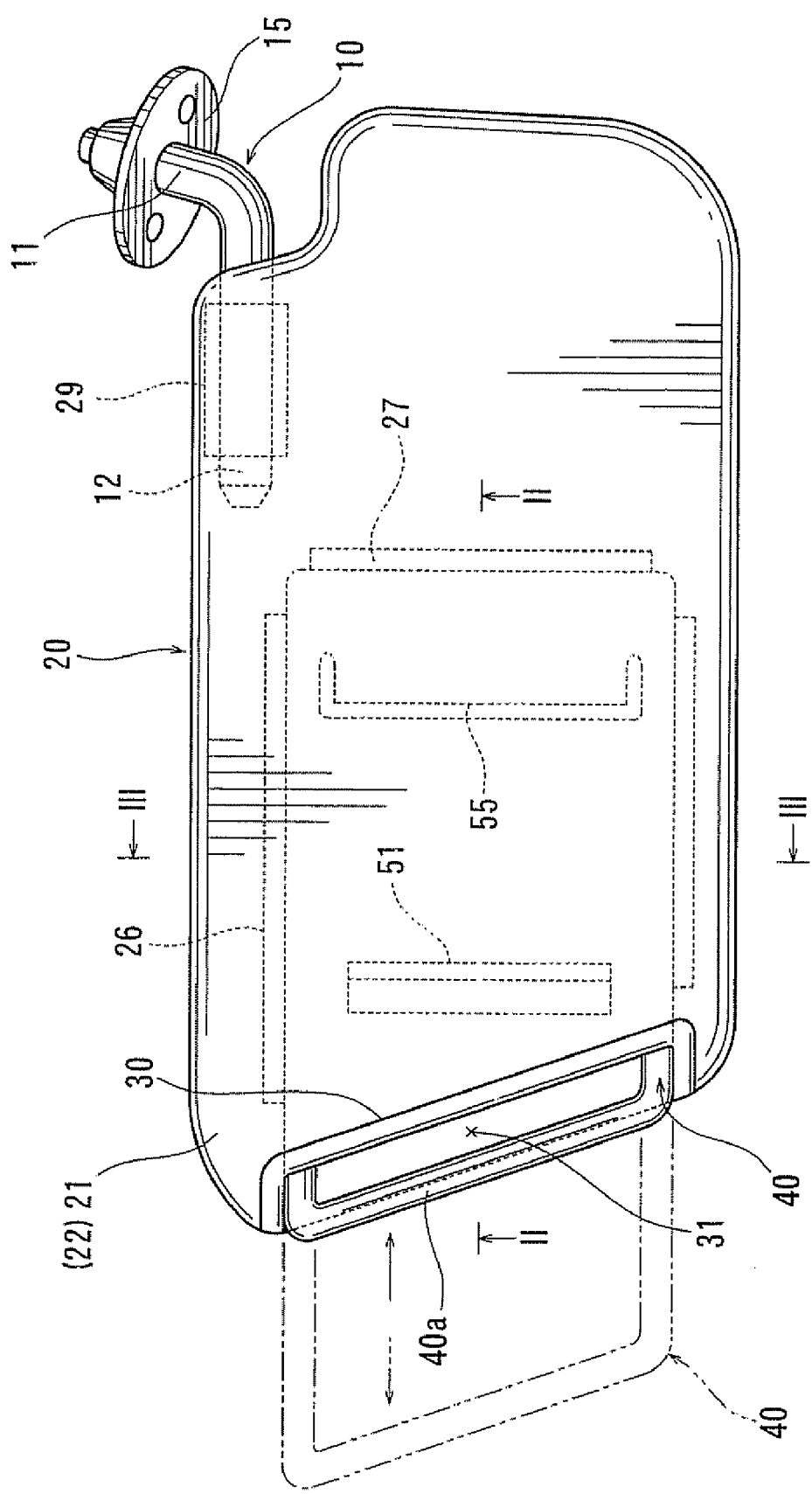
[FIG. 1] This is a front view showing the entire vehicle sun visor according to a first embodiment.

DESCRIPTION OF NUMERALS 10 support rod
20 sun visor body
21 first shell
22 second shell
28 storage space
40 extendable plate
51 stopper member
52 removal-preventing recess
53 inclined surface
55 removal-preventing member

BEST MODE FOR CARRYING OUT THE INVENTION

The best mode for carrying out the present invention will now be described according to embodiments

FIRST EMBODIMENT

Figure 2:
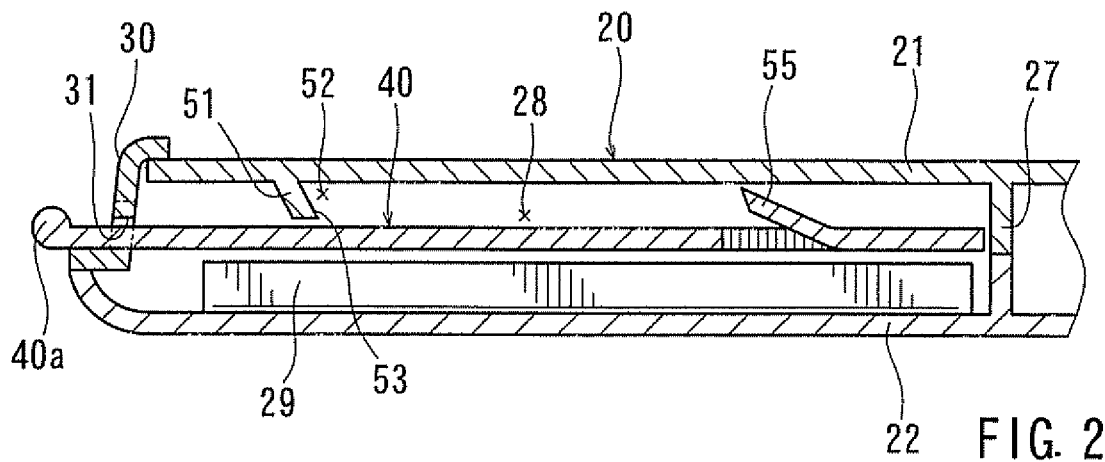
[FIG. 2] This is a cross-sectional view of the same taken along line II—II in FIG. 1
Figure 3:
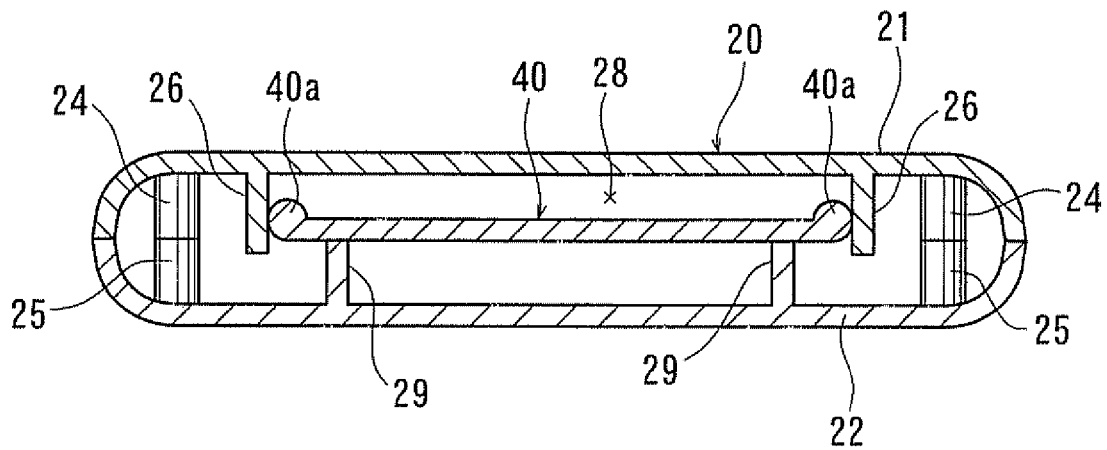
[FIG. 3] This is a cross-sectional view of the same taken along line III—III in FIG. 1.
Figure 4:
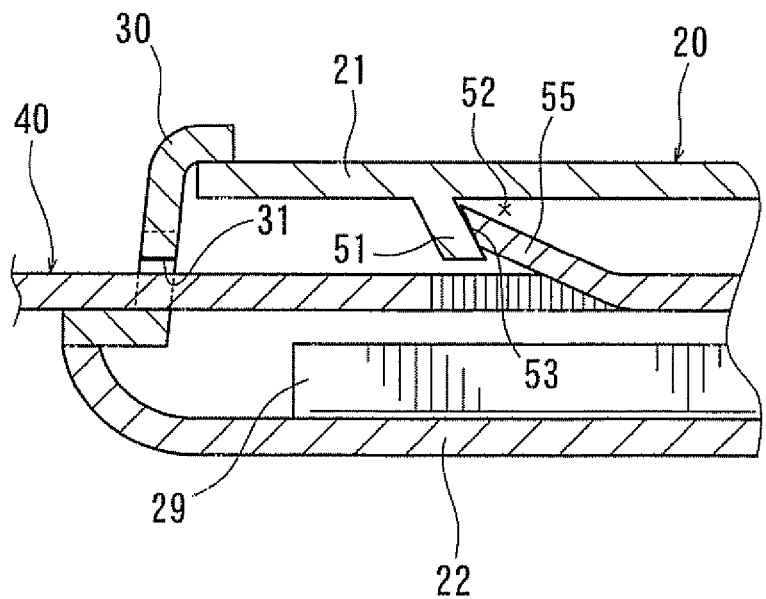
[FIG. 4] This is a cross-sectional view showing in an enlarged scale the state in which an extendable plate has been drawn to a drawing end position relative to a sun visor body of the same.
Figure 5:
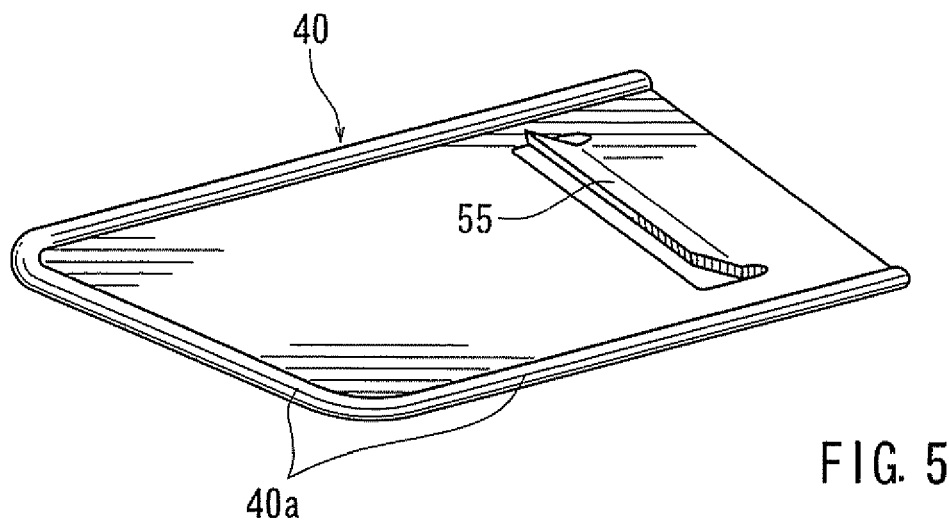
[FIG. 5] This is a perspective view of the extendable plate of the same.
Figure 6:
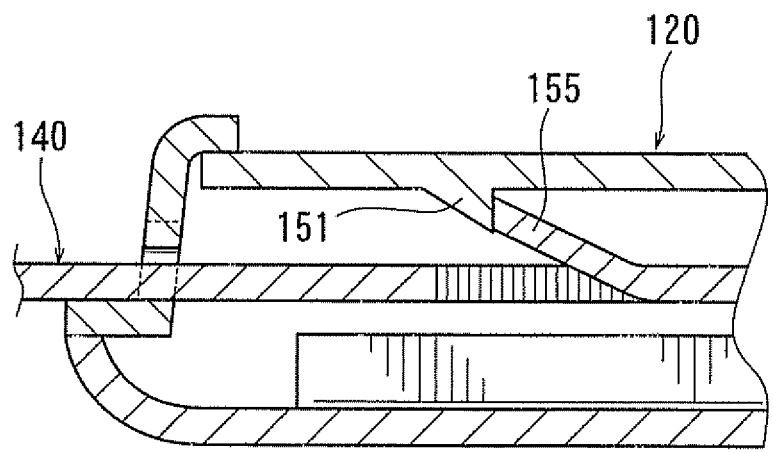
[FIG. 6] This is a cross-sectional view showing the prior art in an enlarged scale the state in which an extendable plate has been drawn to a drawing end position from a sun visor body.
Figure 7:
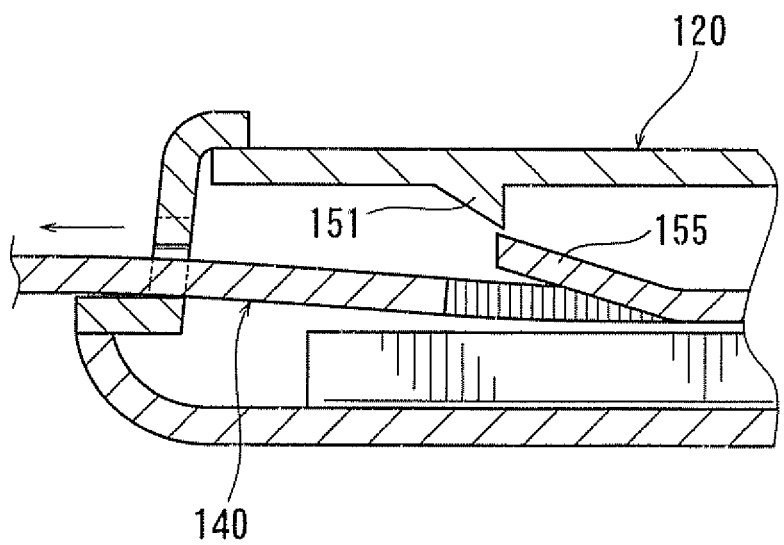
[FIG. 7] This is an explanatory view showing the state where a removal-preventing member of the extendable plate has been disengaged from a stopper member of the sun visor body of the same.

FIG. 1 is a front view showing the entire vehicle sun visor. FIG. 2 is a cross-sectional view taken along line II—II in FIG. 1. FIG. 3 is a cross-sectional view taken along line III—III in FIG. 1. FIG. 4 is a cross-sectional view showing in an enlarged scale the state in which an extendable plate has been drawn to a drawing end position relative to a sun visor body. FIG. 5 is a perspective view of the extendable plate.

As shown in FIG. 1, a vehicle sun visor has a sun visor body 20 and a support rod 10. The support rod 10 has a vertical rod portion 11 and a horizontal rod portion 12 configured into one piece and is formed to have a substantially L-shape configuration. The support rod 10 is mounted at the vertical rod portion 11 to a predetermined position of a ceiling portion of a vehicle cabin via a bracket 15. The horizontal rod portion 12 of the support rod 10 rotatably mounts a sun visor body 20 via a bearing member 29, which is disposed within the sun visor body 20 and proximate to a corner portion thereof, Therefore, as the sun visor body 20 is rotated about an axis of the horizontal rod portion 32, the position of the sun visor body 20 can be changed between a storage position along the ceiling portion of the vehicle cabin and a front light-shielding position along a windshield In addition, as the sun visor body 20 is rotated about the vertical rod portion 11 rearward through an angle of about 90°, the sun visor body 20, positioned at the front light-shielding position, can be changed in position to a side light-shielding position along a side glass.

In this first embodiment, as shown in FIG. 2 and FIG. 3, the sun visor body 20 has a first shell 21 and a second shell 22 as two parts split with respect to the direction of thickness of the sun visor body 20 The first and second shells 21 and 22 are joined into one piece as a hollow shell at their respective joint portions 24 and 25 by a joint means, such as welding, adhesive, resilient engagement, etc. A storage space 28 is defined between the first and second shells 21 and 22 and has an opening on one side thereof for storing an extendable plate 40, used for enlarging a light-shielding area, and for enabling the extendable plate 40 to be drawn into or out. A lip frame member 30, having an inlet/outlet 31 for drawing the extendable plate into and out, is attached to the opening of the storage space 28.

Further, guide walls 26, defining opposing side walls of the storage space 28 and contacting with opposing side edges of the extendable plate 40 for guiding the drawing out of the extendable plate 40, and a back side wall 27 of the storage space 28, are respectively disposed to protrude from the inner wall surface of one of the first or second shells 21 and 22, e.g., the first shell 21 Support pieces 29 are respectively disposed to protrude in parallel with the guide walls 26 from the inner wall surface of the other shell, e.g., the second shell 22, in positions proximate to opposing side portions of one side surface of the extendable plate 40, and to support the extendable plate 40.

As shown in FIG. 1 and FIG. 5, the extendable plate 40, which is stored within the storage space 28 of the sun visor body 20 such that the extendable plate 40 can be drawn into and out, is formed as a horizontally enlarged rectangular plate-shaped configuration. A rib 40a, having a semicircular cross-section, is disposed so as to protrude from the extendable plate 40 along the circumferential edge, except for the inner side end, In addition, a removal-preventing member 55 is formed on a portion of one side surface, near the back side of the extendable plate 40, and protrudes in an inclined form toward the side of the opening of the storage space 28 or the side of the lip frame member 30. Further, in this first embodiment, the removal-preventing member 55 is formed to be elongated along a widthwise direction of the one side surface of the extendable plate 40.

Conversely, as shown in FIG. 2 and FIG. 4, a removal-preventing recess 52 is formed within the sun visor body 20 and may engage a tip end portion of the removal-preventing member 55 for preventing the extendable plate 40 from being removed. In this first embodiment, a stopper member 51 is disposed so as to extend from the inner wall surface of the first shell 21, proximate to the inlet/outlet 31 of the lip frame member 30, and cooperates with the inner wall surface of the first shell 21 in defining the removal-preventing recess 52, Further, an inclined surface 53 is formed on a recess wall surface on one side of the removal-preventing recess, or the inner surface of the stopper member 51, for guiding the tip end portion of the removal-preventing member 55 in a wedging direction into the removal-preventing recess 52.

The vehicle sun visor according to the first embodiment is constituted as described above Therefore, as the sun visor body 20 is rotated about an axis of the horizontal rod portion 32, the sun visor body 20, positioned at the storage position along the ceiling portion of the vehicle cabin, can be changed in position to the front light-shielding position along the windshield. In addition, as the sun visor body 20 is rotated rearward through an angle of about 90° about the vertical rod portion 11, the sun visor body 20, positioned at the front light-shielding position, can be changed in position to the side light-shielding position along the side glass Further, when the extendable plate 40 has been drawn out to the drawing end position, as shown in FIG. 4, the removal-preventing member 55 may engage the removal-preventing recess 52, so that further drawing of the extendable plate 40 may be inhibited In the state where the sun visor body 20 is positioned at the side light-shielding position, the light-shielding area may be enlarged as the extendable plate 40 is drawn out rearward relative to the sun visor, body 20.

If an external force exceeding a predetermined value, such as an impact load produced when a curtain airbag (a side airbag) deploys (inflated), is applied to the extendable plate 40 in the state in which the extendable plate 40 has been drawn out to a predetermined drawing position, the tip end portion of the removal-preventing member 55 of the extendable plate 40 may be guided along the inclined surface 53 of the stopper member 51 disposed within the sun visor body 20 As a result, the tip end portion of the removal-preventing member 55 may wedge into the removal-preventing recess 52, In addition, it is possible to enhance the engaging force between the removal-preventing member 55 and the removal-preventing recess 52 Also, it is possible to reliably prevent the tip end portion of the removal-preventing member 55 from passing over the stopper member 5 and becoming disengaged It is also possible to prevent problems of the extendable plate 40 dropping-off of the sun visor body 20. Further, because the removal-preventing member 55 is formed to be elongated along the widthwise direction of one side surface of the extendable plate 40 in this first embodiment, it is possible to improve the strength of the removal-preventing member 55 and to largely effectively prevent the extendable plate 40 from being removed.

The present invention may not be limited to the first embodiment. For example, the present invention can also be carried out for the case in which the sun visor body 20 is formed as a hollow shell by joining the first and second shells 21 and 22 via a thin integral hinge,

The invention claimed is:

1. A vehicle sun visor in which an extendable plate is mounted within a sun visor body such that the extendable plate can be drawn out of the sun visor body in a drawing direction, the sun visor comprising:
    a removal-preventing member protruding in an inclined configuration and formed on a side surface of the extendable plate, said removal-preventing member having a tip end portion;
    a removal-preventing recess formed within the sun visor body for engaging said tip end portion so as to inhibit the further movement of the extendable plate in the drawing direction; and
    a recess wall surface on one side of the removal-preventing recess and forming an inclined surface for guiding said tip end portion of the removal-preventing member toward a wedging direction into the removal-preventing recess.

2. The vehicle sun visor according to claim 1, further comprising:
    a first shell;
    a second shell;
    wherein the first shell is joined to the second shell and defines a storage space between the first shell and the second shell;
    wherein the storage space includes an inlet/outlet corresponding to the extendable plate;
    a stopper member disposed to protrude from an inner wall surface of one of the first shell or the second shell and including the recess wall surface;
    wherein the removal preventing recess is formed at a position proximate to the inlet/outlet by the stopper member in cooperation with the inner wall surface.

3. The vehicle sun visor according to claim 2, wherein:
the removal preventing member is formed as an elongated member along a widthwise direction of the side surface of the extendable plate.

4. The vehicle sun visor according to claim 1, wherein:
the removal preventing member is formed as an elongated member along a widthwise direction of the side surface of the extendable plate.

5. The vehicle sun visor according to claim 2, wherein:
the first shell is hingedly connected to the second shell along a peripheral edge thereof.

6. A vehicle sun visor comprising;
an extendable plate;
a visor body;
wherein the extendable plate is slidably movable within the visor body between a first position and a second position;
a first removal-preventing member;
a second removal-preventing member;
a recess wall surface formed by one of the first removal-preventing member or the second removal-preventing member;
wherein the extendable plate includes one of the first removal-preventing member or the second removal-preventing member;
wherein the visor body includes the other of the first removal-preventing member or the second removal-preventing member;
wherein a tip of one of the first removal-preventing member or the second removal-preventing member engages the recess wall surface when the extendable plate is in the second position; and
wherein the recess wall surface is inclined with respect to a direction perpendicular to a direction of the sliding movement of the extendable plate.

7. The vehicle sun visor of claim 6 including:
a first visor body half;
a second visor body half;
wherein joining the first visor body half to the second visor body half forms the visor body;
wherein the extendable plate fits between the first visor body half and the second visor body half;
wherein the other of the first removal-preventing member or the second removal-preventing member is included in one of the first visor body half or the second visor body half.

8. The vehicle sun visor as in claim 7, wherein:
the first visor body half is hingedly connected to the second visor body half.

9. A vehicle sun visor comprising;
an extendable plate;
a visor body;
wherein the extendable plate is slidably movable along a lengthwise direction relative to and within the visor body between a first position and a second position;
a first protruding member orthogonal to the lengthwise direction;
a second protruding member orthogonal to the lengthwise direction;
wherein one of the first protruding member or the second protruding member is integrated with an inner wall surface of the visor body;
a removal-preventing recess formed by the one of the first protruding member or the second protruding member and the inner wall surface of the visor body;

wherein an other of the first protruding member or the second protruding member is integrated with a surface of the extendable plate;

wherein a tip of the other of the first protruding member or the second protruding member is inserted into the removal-preventing recess when the extendable plate is in the second position; and wherein the removal-preventing recess includes a recess wall surface inclined with respect to a direction perpendicular to a direction of the sliding movement of the extendable plate, so that the tip of the other of the first protruding member or the second protruding member contacts with the recess wall surface when the extendable plate is in the second position.

* * * * *